United States Patent [19]

Hinckley et al.

[11] Patent Number: 4,785,378
[45] Date of Patent: Nov. 15, 1988

[54] LOOP-FEED WIRING ARRANGEMENT FOR ELECTRIC CIRCUIT BREAKERS AND SWITCHES

[75] Inventors: Heidemarie Hinckley, Nicollet; William M. Childs, Mankato, both of Minn.

[73] Assignee: General Electric Company, New York, N.Y.

[21] Appl. No.: 100,506

[22] Filed: Sep. 24, 1987

[51] Int. Cl.$^4$ ............................................. H01H 73/10
[52] U.S. Cl. .................................... 361/363; 361/346; 361/376; 439/723; 439/709; 174/70 R
[58] Field of Search .............. 361/346, 356, 361, 363, 361/376, 427, 353, 354, 355; 174/70 B, 70 R, 71 B, 72 B; 439/709, 710, 721, 723, 724

[56] References Cited

U.S. PATENT DOCUMENTS 3,801,875 4/1974 Morby et al. ...................... 317/120

Primary Examiner—A. D. Pellinen
Assistant Examiner—David A. Osborn
Attorney, Agent, or Firm—Richard A. Menelly; Walter C. Bernkopf; Fred Jacob

[57] ABSTRACT

Double-lug wiring assemblies are added to multipole electric circuit breaker load centers to allow for loop-feed connection between the load centers when employed within satellite power take-off facilities. The loop-feed arrangement results in a substantial savings in wire costs and installation time.

4 Claims, 3 Drawing Sheets

4,785,378

LOOP-FEED WIRING ARRANGEMENT FOR ELECTRIC CIRCUIT BREAKERS AND SWITCHES

BACKGROUND OF THE INVENTION

Maintenance free non-metallic load center enclosures are finding increasing utilization within trailer parks and marinas wherein several satellite load centers are connected with a main or central load center. Each satellite load center includes one or more molded case circuit breakers or fused disconnect switches which connect individually with the distribution transformer or central load center. One such load center is described in U.S. Pat. No. 3,801,875 entitled "Non-Metallic Load Center with Improved Bus Bar Construction", this application is incorporated herein for reference purposes and should be reviewed for a description of the arrangement of the bus bars and circuit breakers within the load center.

When the load centers are connected within a satellite installation, the satellite load centers are electrically connected with the central load center by means of a radial-feed system wherein each of the two-pole or three-pole circuit breakers within the satellite load centers is electrically connected with the central load center by at least three separate wires. Where several dozen satellite load centers are involved, such as within trailer parks and marinas, a large amount of wire is involved along with a considerable expenditure of installation time.

One purpose of the instant invention is to provide a method and means for electrically connecting a central load center with a plurality of satellite load centers by directly interconnecting between the individual satellite load centers without requiring separate wire connections with the central load center.

SUMMARY OF THE INVENTION

Individual load centers within a satellite load center installation are provided with multiple line terminal lugs and multiple neutral terminal lugs to allow for connecting between the individual satellite load centers in a loop-feed arrangement. The multiple terminal lugs can be either factory-installed within the individual satellite load centers before shipment or field-installed at the installation site by means of a loop-feed assembly kit.

DESCRIPTION OF THE PREFERRED EMBODIMENT

Figure 1:
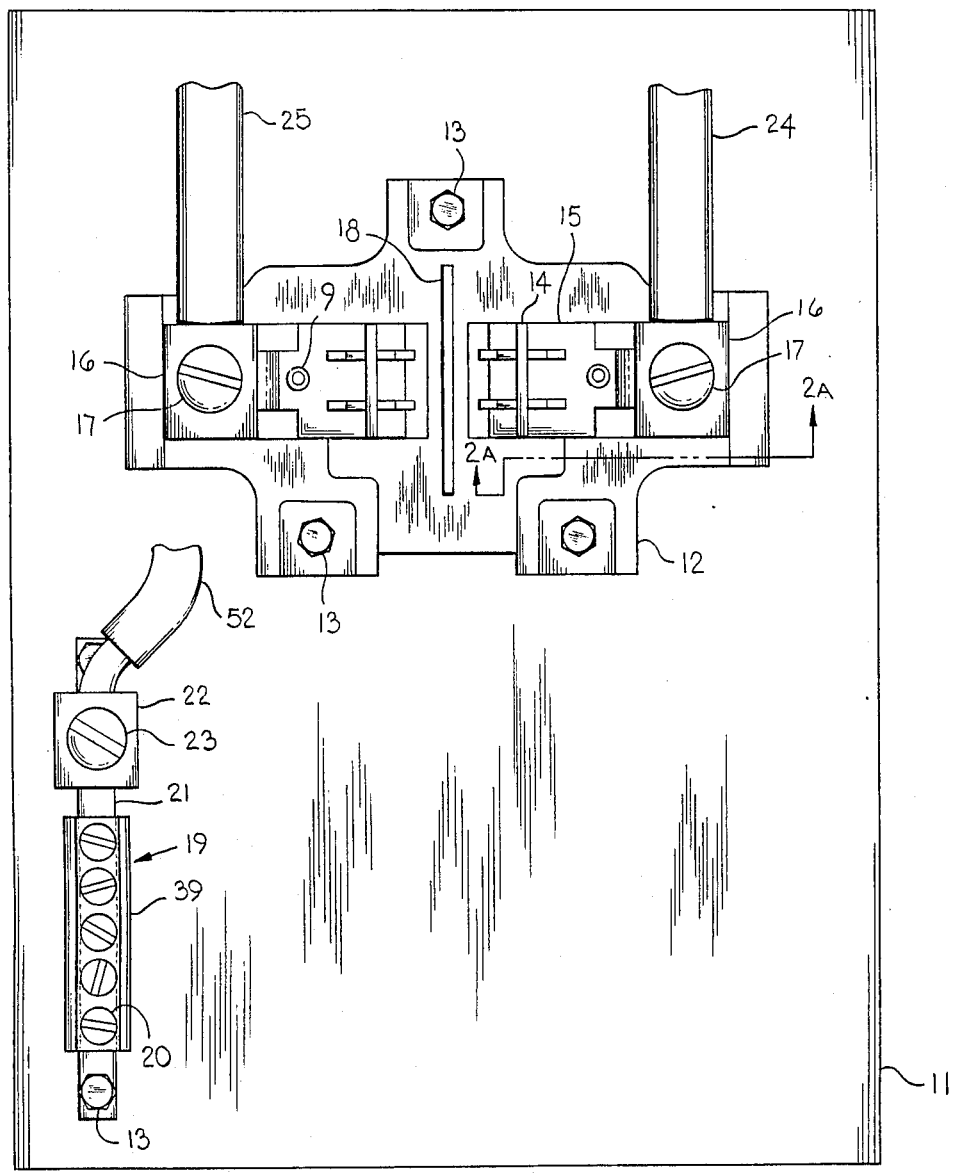
FIG. 1 is a plan view of a two-pole load center according to the Prior Art.

A load center 10 of the type commonly employed within trailer parks and marinas is shown in FIG. 1 and consists of a plastic bottom 11 which carries an insulative support 12 on to which a circuit breaker or electric switch (not shown) is assembled. The support 12 is attached to the load center bottom 11 by means of recessed screws 13 and includes a pair of circuit breaker or electric switch stabs 14 insulated from each other by an integrally formed dielectric shield 18. A line terminal lug 16 hereto "load center line terminal lug" which contains the line terminal screw 17 hereafter "load center line terminal screw" slips onto the line terminal strap 15 which, in turn, is fastened to the support 12 by means of rivets 9. When a two-phase power distribution system is connected to the load center, one-phase line conductor 24 is attached to one load center line terminal lug 16 and a separate phase line conductor 25 is attached to the other load center line terminal lug 16 as indicated. As described in aforementioned U.S. Pat. No. 3,801,875, a circuit breaker is attached to the circuit breaker stabs 14 and the wire conductors leading to an external load (not shown) are connected to the load terminal screws on the circuit breaker. The circuit neutral connection is made with the external load by means of a neutral bar 19 which is attached to the bottom 11 by means of screws 13 as shown. The circuit neutral conductor 52 connects with the neutral bar by means of a neutral lug 22 and neutral lug screw 23. The neutral lug is first attached to the neutral strap 21 which is then inserted within an electrically conductive perimetrically closed sleeve 39 to which the neutral connector screws 20 are threadingly attached. Neutral connection with the external loads is made by connecting a corresponding plurality of wires (not shown) with each of the neutral connector screws 20. The load center 10 when employed as the central load center is individually wired with a distribution transformer (not shown) by means of the two-phase line conductors 24, 25 and the circuit neutral conductor 52. When a plurality of such load centers are employed within a radial-feed two-phase power distribution system as described earlier, each of the satellite load centers must be electrically connected with the distribution transformer or central circuit breaker by means of a separate pair of line conductors and a separate neutral conductor.

Figure 2A:
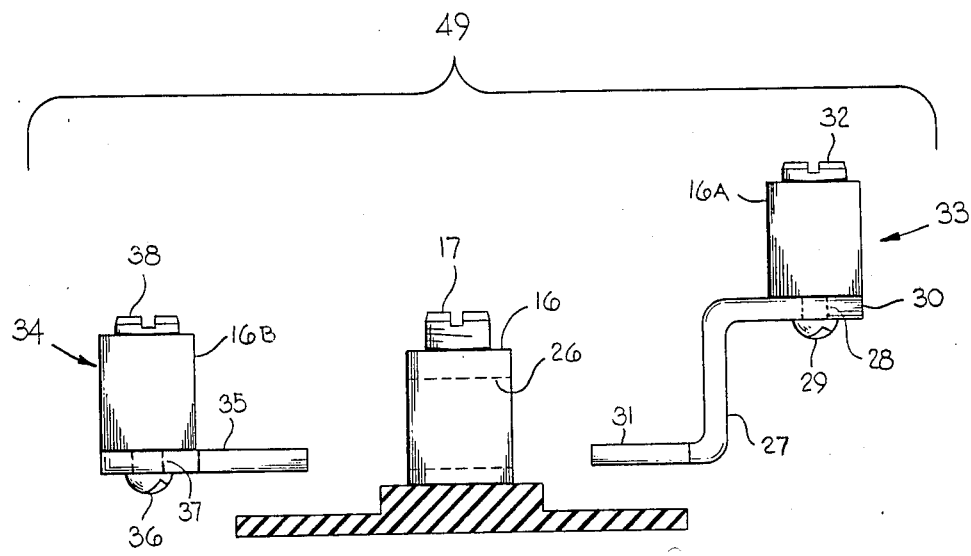
FIG. 2A is a dual-line terminal lug assembly used with the single lug assembly depicted in FIG. 1.

When connecting the satellite load centers by means of a loop-feed arrangement whereby each satellite load center is connected with the next satellite load center instead of with the central load center, the loop-feed line terminal lug 49 arrangement depicted in FIG. 2A is used. The loop-feed line terminal lug arrangement hereafter "loop-feed lug" includes an upper line terminal lug 33 and a lower line terminal lug 34. The upper line terminal lug includes terminal lug 16A and terminal screw 32 which are attached to a Z-shaped line strap 27 by means of a screw 29 and a slot 28 through the offset end 30. The opposite offset end 31 of the Z-shaped line strap 27 is connected with the load center line terminal lug 16 by inserting the offset end 31 within the load center line terminal lug opening 26. The lower line terminal lug 34 includes a terminal lug 16B and terminal screw 38 which are attached to a planar line strap 35 by means of screw 36 and slot 37. The lower line terminal lug 34 is connected with both the load center line terminal lug 16 and the offset end 31 of the Z-shaped line strap 27 by inserting the planar strap 35 within the load center line terminal lug opening 26 and tightening the load center line terminal screw 17 to bear down on both the offset end 31 of the Z-shaped line strap 27 and the planar line strap 35. The provision of upper and lower line terminal lugs 33, 34 insure that the incoming two-phase line conductors 24, 25 and outgoing two-phase line conductors 24', 25', (FIG. 3) are readily identified in order to prevent inadvertent harm which could occur by erroneously disconnecting the outgoing two-phase line conductors 24', 25' instead of the incoming two-phase line conductor 24, 25 when service is performed or connections are made with loads connected to the load center. The provision of the upper terminal lug 33 also provides clearance for the outgoing conductors 24', 25' within the close tolerances of the load center.

Figure 2B:
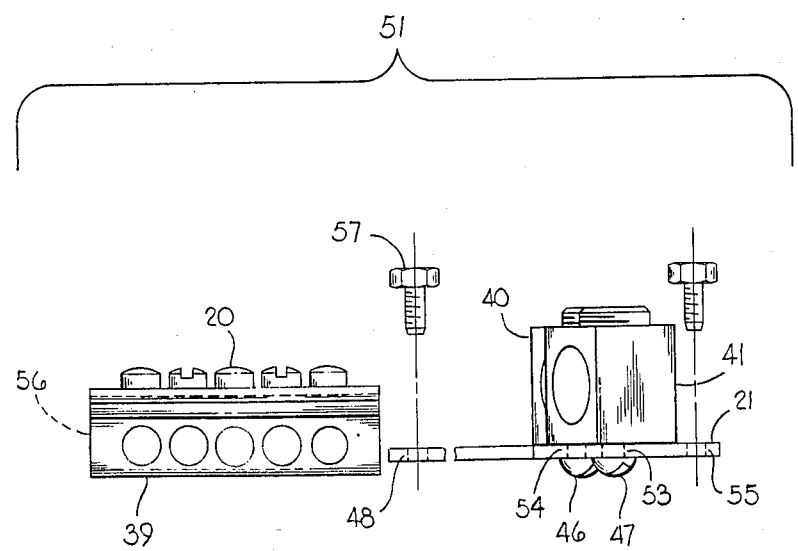
FIG. 2B is a side view of a dual-neutral terminal lug assembly used with the single-neutral terminal lug depicted in FIG. 1.

A loop-feed neutral bar 51 as shown in FIG. 2B includes a pair of offset neutral lugs 40, 41 which are attached to a neutral strap 21 by means of screws 46, 47 and slots 53, 54. One end of the neutral strap 21 is inserted within the bottom of the extended opening 56 through the tubular sleeve 39 to which the neutral connector screws 20 are attached. The loop-feed neutral bar 51 is attached to the bottom 11 of the load center 10 (FIG. 1) by inserting screws 57 through slots 48 and 55 formed at opposite ends of the neutral strap 21.

Figure 3:
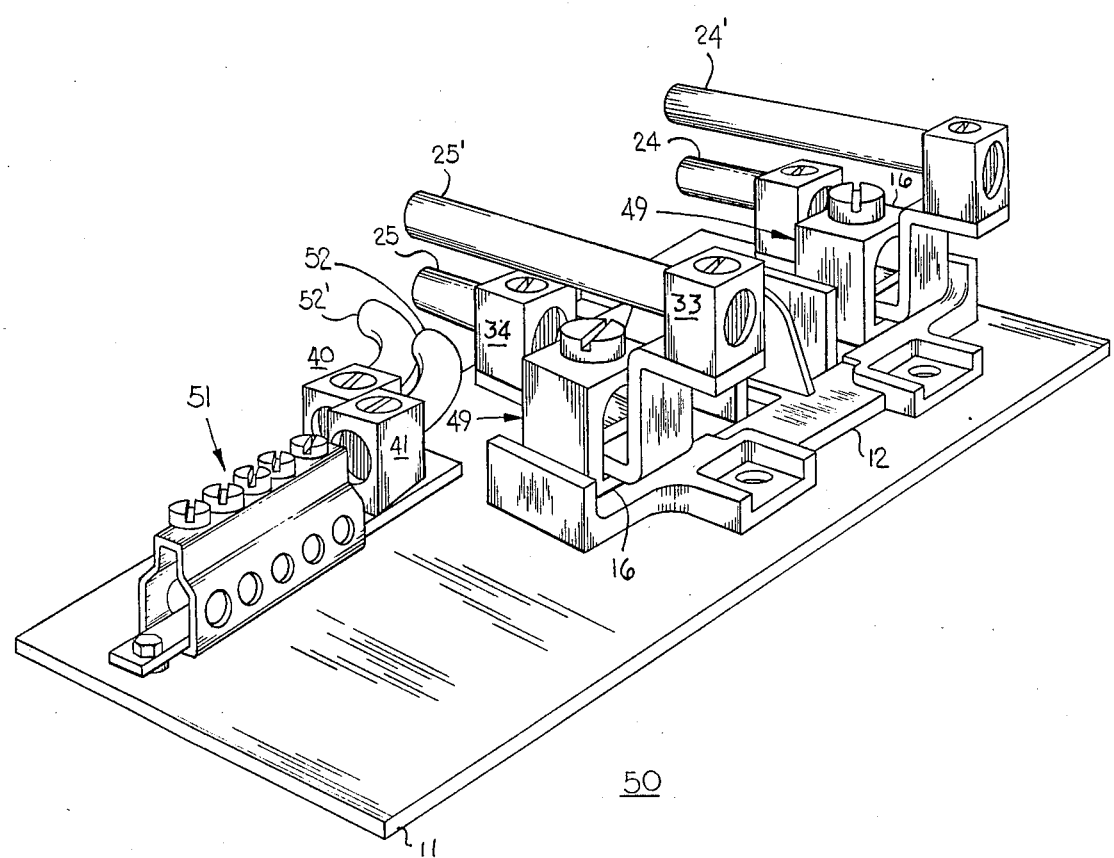
FIG. 3 is a top perspective view of a load center according to the invention arranged for wiring within a loop-feed system.

A loop-feed connected load center 50 is depicted in FIG. 3 with a pair of loop-feed line terminal lugs 49 connected to the load center line terminal lugs 16 and attached to the circuit breaker support 12 on the bottom 11 of the load center. Also shown are the incoming two-phase line conductors 24, 25 connected with the lower line terminal lugs 34 and the outgoing conductors 24', 25' connected with the upper line terminal lugs 33. The loop-feed neutral bar 51 is arranged on the bottom 11 as described earlier with the incoming neutral conductor 52 connected with one offset neutral lug 41 and with the outgoing neutral conductor 52' connected with the other offset neutral lug 40 as indicated.

It is thus been shown that circuit breaker and electric switch load centers can be adapted for loop-feed connection at either the point of manufacture or at the installation site by means of loop-feed line terminal lugs and loop-feed neutral bar lugs in accordance with the teachings of the instant invention.

Having thus described my invention, what we claim as new and desire to secure by Letters Patent is:

1. A load center comprising:
  an insulative support;
  a line terminal lug attached to said support;
  a first lug electrically connected to said line terminal lug on one side of said line terminal lug and arranged for electrically connecting with a first conductor;
  a second lug electrically connected to said line terminal lug on an opposite side of said line terminal lug and arranged for electrically connecting with a second wire conductor; and
  a neutral bar including an elongated perimetrically closed tubular conductor having a pair of neutral lugs electrically connected thereto and arranged for electrically connecting with a third and fourth wire conductor, said first lug being attached to a Z-shaped strap, said Z-shaped strap terminating in a pair of offset ends wherein one of said offset ends is attached to said first lug and the other of said offset ends is electrically connected with said line terminal lug.

2. The load center of claim 1 wherein said pair of neutral lugs are each offset from each other and are arranged in the same plane.

3. The load center of claim 1 wherein said second lug is attached to a planar strap.

4. The load center of claim 3 wherein said second lug is attached to one end of said planar strap and said line terminal lug is electrically connected to said other end.

* * * * *